April 23, 1940.        P. L. FLETCHER        2,198,158
GUARD FOR COOKING UTENSILS
Filed March 14, 1939
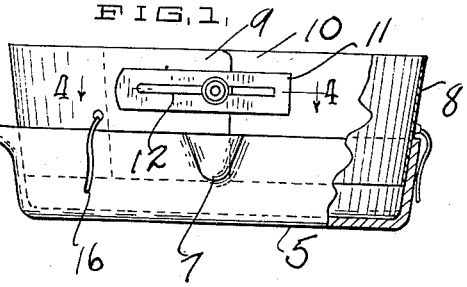
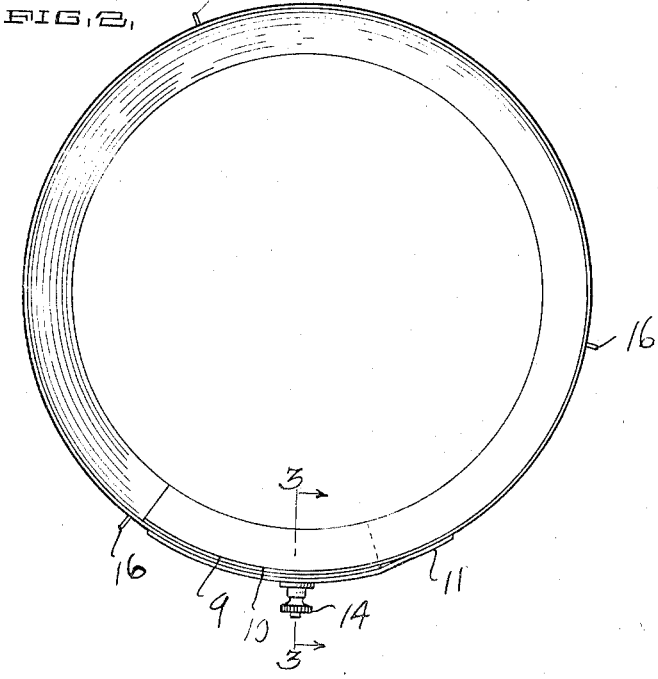
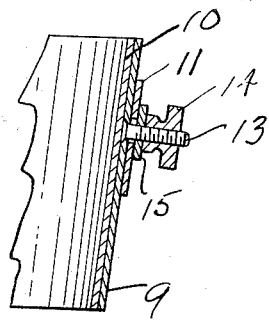
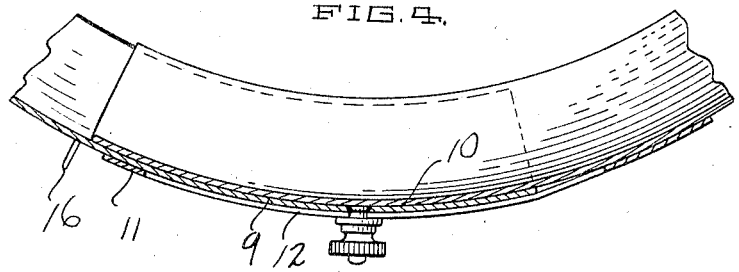
INVENTOR:
PEARLE L. FLETCHER.
BY
ATTORNEYS.

Patented Apr. 23, 1940

2,198,158

UNITED STATES PATENT OFFICE 2,198,158

GUARD FOR COOKING UTENSILS

Pearle L. Fletcher, San Francisco, Calif.

Application March 14, 1939, Serial No. 261,819

1 Claim. (Cl. 53—7)

This invention relates to attachments for cooking utensils, and has particular reference to a guard or shield adapted to be detachably secured to a frying pan and functioning to prevent grease from splattering on adjacent food products or on the person utilizing the pan.

The principal object of the invention is to provide a positive shield, so constructed that it will fit deeply into the pan, and which by virtue of the novel fastening element employed will present a continuous circular shield that will prevent the grease from passing therethrough.

A further object of the invention is to employ a shield that is readily adjustable to varying diameters of pans, a shield that is economical to manufacture, positive in operation, highly durable and serviceable.

Other objects and advantages will be apparent during the course of the following description.

In the accompanying drawing forming a part of this specification and in which like numerals are employed to designate like parts throughout the same, Fig. 1 is a side elevation of a frying pan, showing the guard applied thereto, with a portion of the pan and guard being shown in section;

Fig. 2 is a plan view of the guard;

Fig. 3 is an enlarged detail view disclosing the means for securing the respective ends of the guard one to the other, the view being a vertical section on the line 3—3 of Fig. 2; and Fig. 4 is an enlarged fragmentary view disclosing the overlapping relation of the ends of the guard and the fastening means.

Great annoyance has been experienced while cooking, due to the fact that grease from a frying pan will spatter adjacent food being cooked, or the person of the cook. To overcome this annoyance, I have devised a unique arrangement of a shield that can be readily detachably secured to varying diameters of pans.

In the accompanying drawing wherein for the purpose of illustration is shown a preferred embodiment of my invention, the numeral 5 designates a frying pan equipped with a conventional handle 6 and a spout 7. This pan is of a circular formation, and in it is positioned the guard which consists of a single blank of metal, preferably tin, which blank is indicated by the numeral 8. The said shield is provided with ends 9 and 10, and is bent in a circular form, so as to conform to the contour of the pan. It will be noted that the said blank tapers, so that the bottom of the same can be readily inserted in the pan below the plane of the pouring spout. The end 9 overlaps the end 10, and as disclosed to advantage in Fig. 1, it will be noted that a tongue 11 has one end secured at 11' to the end 10 some distance from its vertical edge and said tongue is provided with a slot 12. Secured to the end 9 is a screw 13, which passes through the slot 12 in the free end of the tongue and has threadedly secured thereon a thumb nut 14, while a washer 15 is likewise positioned on the screw.

By virtue of the construction employed, it will be obvious that the end 9 may be moved laterally with relation to the end 8, and by tightening the thumb nut the shield may be accommodated to pans of varying diameters.

To prevent accidental displacement of the shield from the pan, I have provided a plurality of clips 16, which are soldered to the shield and are inwardly bent adjacent their ends, so as to contact the outer periphery of the frying pan. By securing the tongue directly to the end 10, it will be obvious that the material of the end 9 will prevent grease from passing through the slotted tongue.

From the foregoing description considered in connection with the accompanying drawing, it will be obvious that I have devised a simple inexpensive shield that will readily accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A guard for cooking utensils adapted to be positioned in the body of a pan and comprising a body portion made of a single blank of metal and bent into a circular form having its edges overlapping a considerable distance, a tongue rigidly secured at one end to the underlying portion of the body and having a slotted portion extending over the overlying portion of the body, a screw threaded member carried by the overlying portion of the body and passing through the slot in the tongue and having a thumb nut thereon on the outside of the tongue.

PEARLE L. FLETCHER.